United States Patent [19]
Eichhorn et al.

[11] Patent Number: 5,988,837
[45] Date of Patent: Nov. 23, 1999

[54] METHOD OF ADJUSTING A VEHICLE HEADLIGHT AND HEADLIGHT UNIT

[75] Inventors: Karsten Eichhorn, Ennigerloh; Franz-Josef Kalze, Harsewinkel; Christian Plattfaut, Lippstadt, all of Germany

[73] Assignee: Hella KG Hueck & Co., Lippstadt, Germany

[21] Appl. No.: 08/934,615

[22] Filed: Sep. 22, 1997

[30] Foreign Application Priority Data

Sep. 26, 1996 [DE] Germany ................... 196 39 526

[51] Int. Cl.⁶ ..................................... B60Q 1/12
[52] U.S. Cl. .................. 362/464; 362/466; 362/467; 362/543
[58] Field of Search .................. 362/464, 465, 362/466, 467, 543, 544

[56] References Cited

U.S. PATENT DOCUMENTS

| | | | |
|---|---|---|---|
| 2,277,685 | 3/1942 | Bergstrom | 240/41.25 |
| 4,833,573 | 5/1989 | Miyauchi et al. | 362/71 |
| 5,353,203 | 10/1994 | Bertling et al. | 362/61 |

FOREIGN PATENT DOCUMENTS

| | | |
|---|---|---|
| 35 06 405 C2 | 8/1985 | Germany . |
| 37 04 029 A1 | 8/1988 | Germany . |
| 38 08 086 C2 | 9/1989 | Germany . |
| 195 49 077 A1 | 7/1996 | Germany . |

*Primary Examiner*—Nimeshkumar D. Patel
*Assistant Examiner*—Todd Reed Hopper
*Attorney, Agent, or Firm*—Griffin, Butler, Whisenhunt & Szipl, LLP

[57] ABSTRACT

A method for adjusting a vehicle headlight during cornering, involves creating cornering light by superimposing a light distribution pattern (37) with a greater horizontal dispersion than that of a low-beam light onto the low-beam light distribution pattern (36). A fog-light distribution pattern (37) of a fog light is used as the light distribution pattern having the greater horizontal dispersion. A single headlight unit can be used for generating such cornering light according to the method of this invention.

10 Claims, 4 Drawing Sheets

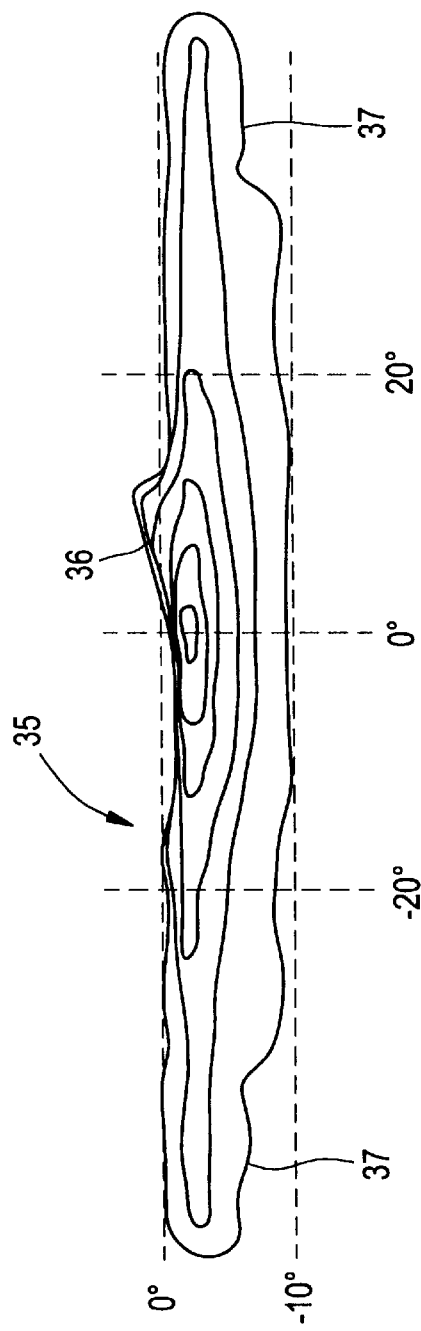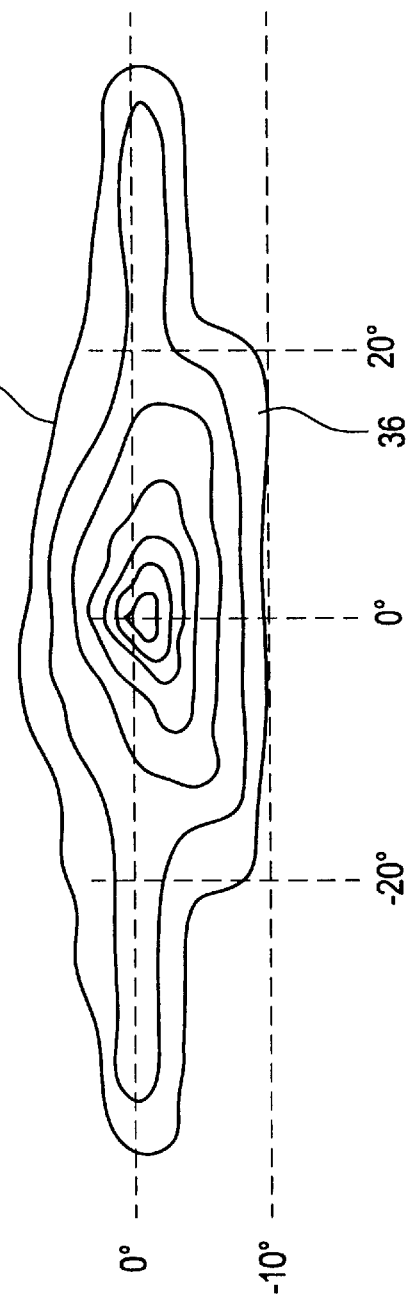

METHOD OF ADJUSTING A VEHICLE HEADLIGHT AND HEADLIGHT UNIT

BACKGROUND OF THE INVENTION

This invention relates to a method for adjusting a vehicle headlight during cornering and/or at intersections.

This invention also relates to headlight units for generating cornering light, having a reflector surface designed for that purpose. Also, this function is appropriate for adverse weather lamps.

A headlight is known for adjusting vehicle lighting during cornering, in which the headlight is pivoted about a vertical axis, depending on a turning radius or steering deflection. This requires an additional pivoting device, is costly, and entails an increased space requirement in a vehicle body.

Furthermore, European patent document (EP 0 661 193 A1) discloses a headlight in which an upper region of a reflector is divided into two segments that can be moved by use of electrical signals. The movable segments are controlled as a function of lateral inclination of a motorcycle, as registered by a sensor. Such control of individual reflector segments is mechanically costly, expensive, and trouble-prone. On the other hand, of course, it is also appropriate to provide good lateral illumination of sides of roads when cornering, but without blinding on-coming traffic when driving straight.

It is, therefore, an object of this invention to provide an inexpensive, safe, and uncomplicated method of illuminating sides of roads, even during cornering, without blinding on-coming traffic when driving straight.

It is a further object of this invention to provide a headlight unit for carrying out the method of this invention.

SUMMARY

According to the principles of this invention, a cornering light is generated by superimposing a light distribution pattern with greater horizontal dispersion than that of a low-beam light onto a low-beam light with a low-beam light distribution pattern.

According to further principles of this invention, a fog-light distribution pattern is superimposed onto the low-beam light distribution pattern. By superimposing the fog-light distribution pattern onto the low-beam light distribution pattern, a cornering light with improved lateral illumination is achieved in an uncomplicated manner.

BRIEF DESCRIPTION OF THE DRAWINGS

The invention is described and explained in more detail below using an embodiment shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 4 is a graphic plot similar to FIG. 1 showing a representation of a distribution of the low-beam light with the fog light superimposed thereon, on a 10-m wall;

FIG. 5 is a graphic plot similar to FIG. 1 showing a representation of the light distribution of the low-beam light with high-beam light superimposed thereon, on the 10-m wall;

DESCRIPTION OF THE PREFERRED EMBODIMENT

Figure 1:
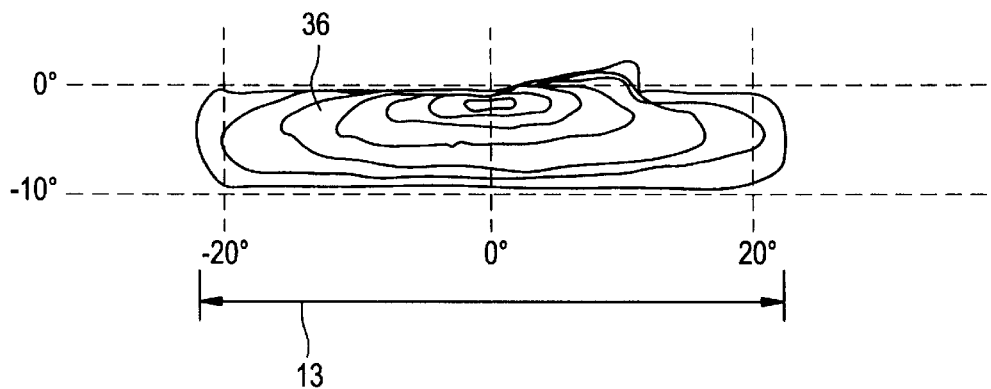
FIG. 1 is a graphic plot showing a representation of a low-beam light distribution pattern on a wall at a distance of 10 m from a headlight creating it.

A vehicle headlight unit 1 comprises mainly a reflector 2, a first lamp 3, a second lamp 4, an electric motor 5, and an electronic drive 31.

Figure 2:
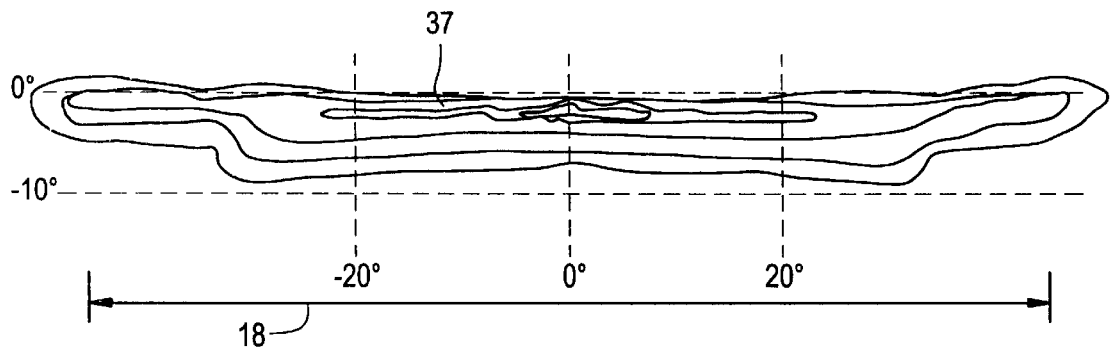
FIG. 2 is a graphic plot similar to FIG. 1 of a representation of a fog-light distribution pattern on a wall at a distance of 10 m.
Figure 3:
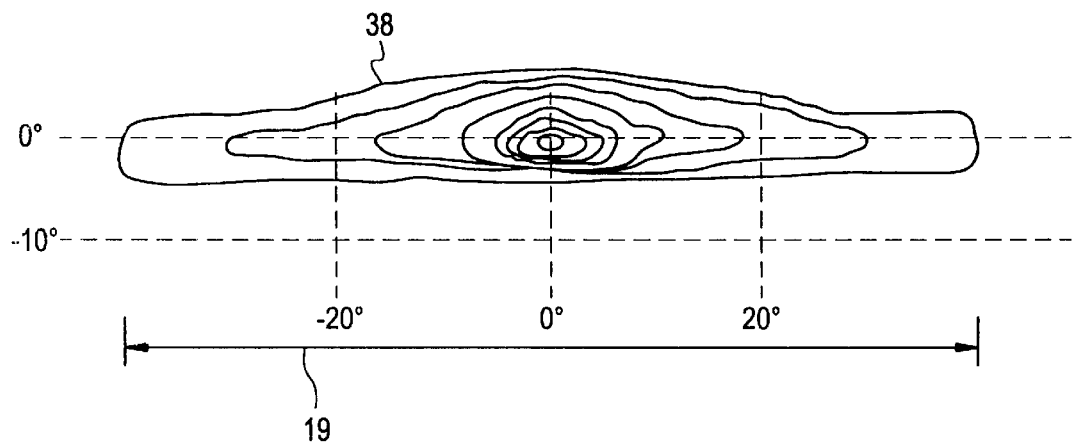
FIG. 3 is a graphic plot similar to FIGS. 1 and 2 showing a representation of a high-beam light distribution pattern on a wall at a distance of 10 m.
Figure 6:
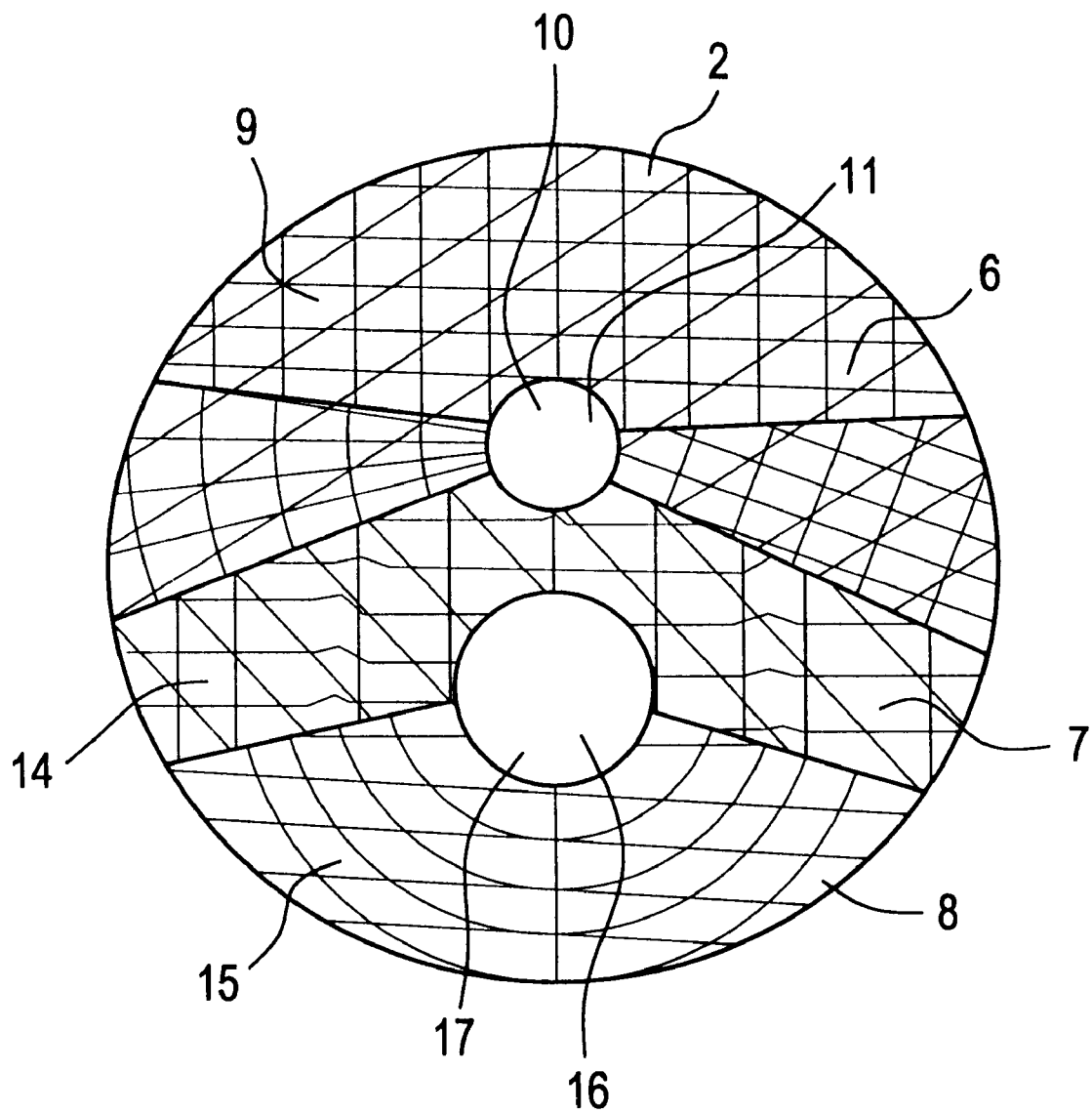
FIG. 6 is a simplified front view of a reflector of this invention.
Figure 7:
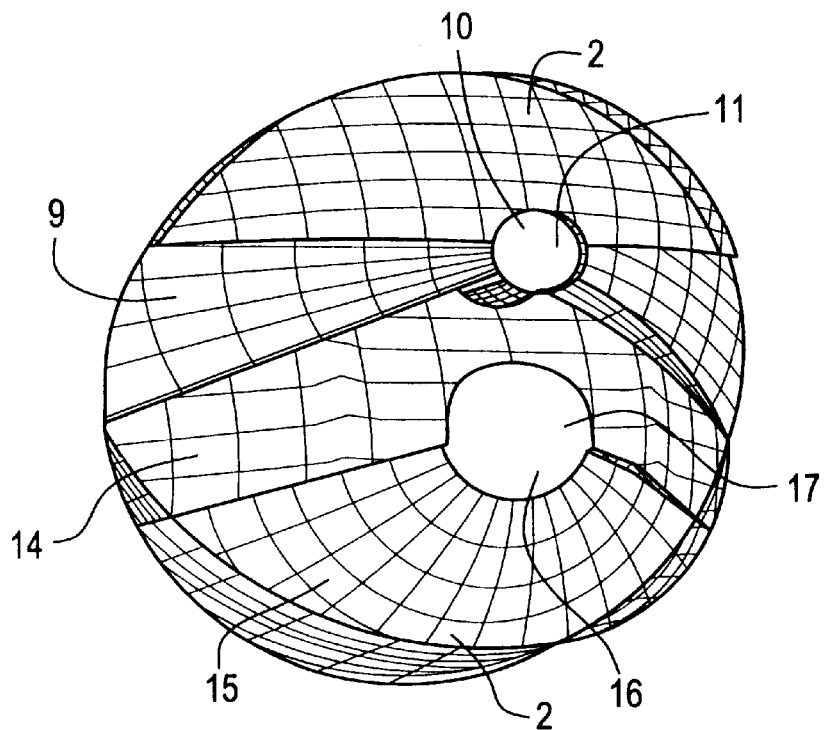
FIG. 7 is a simplified, isometric view of the reflector in FIG. 6.

As illustrated in FIG. 6, the reflector 2 is divided vertically into an upper region 6, a middle region 7, and a lower region 8. The upper region 6 is constructed as a low-beam light surface 9. The low-beam light surface 9 has a first center 10 with a first pass-through opening 11. The first lamp 3 can be set into position from the back 12 of the reflector 2 through the first pass-through opening 11. The low-beam light surface 9 is constructed so that a low-beam light distribution pattern 36 has a horizontal dispersion 13 of approximately ±20 to 25 degrees, see FIG. 1. Good and homogenous illumination of a forward field and a large range, among other things, are achieved with the relatively narrow horizontal dispersion 13. The middle region 7 is constructed as a fog-light surface 14, and the lower region 8 is constructed as a high-beam surface 15 with a fog-light distribution pattern 37 and a high-beam light distribution pattern 38, as illustrated in FIGS. 2 and 3, respectively. The fog-light surface 14 and the high-beam surface 15 have a second center 16 with a second pass-through opening 17. The second lamp 4 is placed into position from the back 12 into the second pass-through opening 17 of the reflector 2. The fog-light surface 14 is formed so that a horizontal dispersion 18 of the fog light is approximately ±45 to 50 degrees. The fog-light distribution pattern can be superimposed onto the low-beam light distribution pattern. This produces a combined light distribution pattern as shown in FIG. 4. An overlapping with the low-beam light in a range of ±20 to 25 degrees assures approximately 4 lx. The high-beam light surface 15 is formed so that a high-beam light distribution pattern 38 has a horizontal dispersion 19 of approximately ±35 to 45 degrees. The high-beam light can be superimposed onto the low-beam light. This produces a further combined light distribution pattern as shown in FIG. 5.

The first lamp 3 is designed as an H7 lamp with a low-beam light coil. The second lamp 4 is designed as an H4 lamp. It has a low-beam light coil, which is utilized as a fog light coil for generating fog light. The second lamp 4 also has a high-beam light coil for generating high-beam light.

Figure 8:
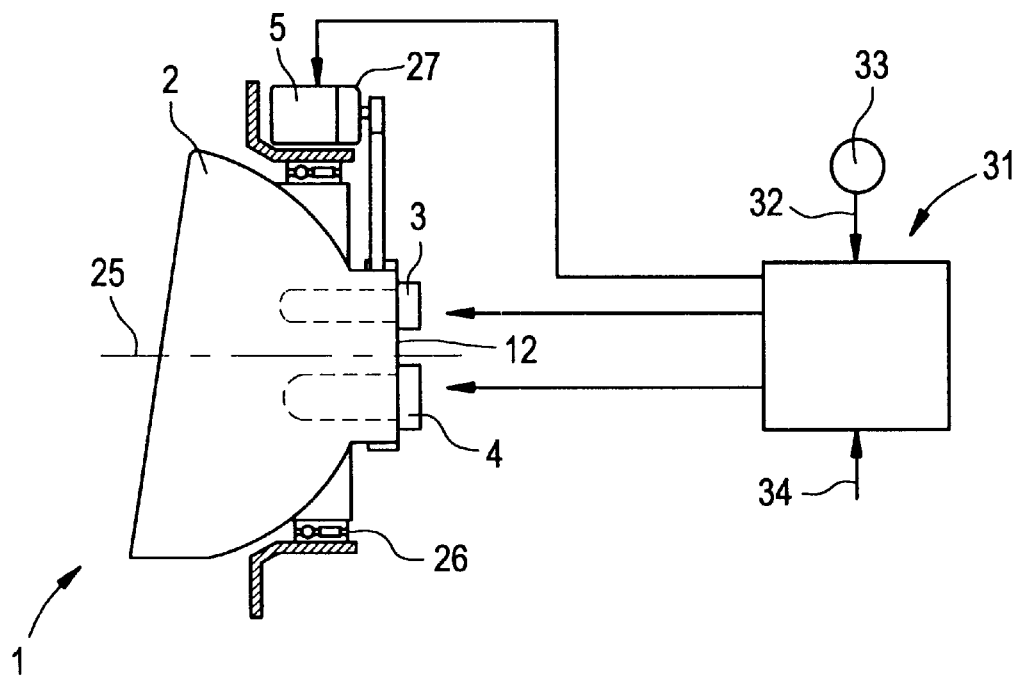
FIG. 8 is a side view of a reflector that can be pivoted about a central axis by means of an electric motor, with a schematic representation of a drive mechanism therefor.

As illustrated in FIG. 8, the reflector 2 is supported on a bearing 26 to be pivotal about its central axis 25. The electric motor 5 is connected to the reflector 2 via gearing 27, and pivots the reflector 2 depending on the lateral inclination of a vehicle on which the headlight is mounted. The electronic drive 31 controls the first and the second lamps 3, 4 and the electric motor 5. The electronic drive 31 is constructed as a system based on a microcontroller that coordinates signal inputs, such as a signal input 32 from an inclination sensor 33 or from a control signal 34 of a driver of the vehicle, using algorithms and combines the basic light distribution patterns 36, 37, 38.

For generating the cornering light or the cornering light distribution pattern 35, the fog-light distribution pattern 37 that is variable in intensity or brightness is gradually brightened onto the low beam distribution pattern 36. Gradual brightening occurs via an electronic dimmer switch contained in the electronic drive 31. The dimmer switch is designed as a clocked direct current power supply with a modulated pulse-pause ratio. A signal from the inclination sensor 33 or from a sensor for registering a turning, or steering, radius is utilized by the electronic drive 31 for controlling the brightness of the fog-light distribution pattern 37 as a function of the inclination of the vehicle during cornering or as a function of steering radius. The signal of the inclination sensor 33 is further utilized by the electronic drive 31 for controlling the electronic motor 5 so that changes in the cornering light distribution pattern 35 in a horizontal direction—as a result of the inclination of the vehicle—are countered by pivoting the reflector 2.

The cornering light 35 can also be generated basically, not by use of a single reflector 2 in the headlight unit 1, but by means of two reflectors, namely a low-beam light reflector of a first headlight and a fog light reflector of a second headlight.

It will be understood by those of ordinary skill in the art that the method of this invention is performed without any mechanical pivoting in a horizontal direction, that is about a vertical axis, and therefore can be brought about inexpensively using electronic measures. A special cornering light that does not blind on-coming traffic is thus provided.

In a preferred embodiment of this method, a fog-light distribution pattern is superimposed on a low-beam light distribution pattern, a brightness of which is regulated as a function of cornering. Regulation of the brightness of the fog light is carried out by a clocked direct current power supply with a modulated pulse-pause ratio.

In accordance with a further preferred embodiment of the inventive method, a fog-light distribution is gradually brightened as a function of lateral inclination of the vehicle.

According to a further preferred embodiment, basic light distribution patterns that are coordinated with each other, such as a low-beam light distribution pattern, a fog-light distribution pattern, and a high-beam light distribution pattern, can be combined by an electronic drive, or controller. In addition, if a vehicle is subject to lateral inclination, it is possible to counter a change in a horizontal orientation of the cornering light caused by the inclination of the vehicle by pivoting a reflector creating the cornering light about its central, optical, axis.

According to a preferred embodiment, the headlight unit has a reflector having the low-beam light surface for generating the low-beam light distribution pattern, the fog-light surface for generating the fog-light distribution pattern, and the high-beam light surface for generating the high-beam light distribution pattern. The basic light distribution patterns are coordinated with each other. The low-beam light distribution pattern is generated by a first lamp, and the fog and high-beam light distribution patterns are generated by a second lamp. The second lamp is equipped with a coil for generating the fog-light distribution pattern, and a coil for generating the high beam distribution pattern. The headlight unit has an electronic drive designed as a system based on a microcontroller that coordinates signal inputs using algorithms and combines the basic light distribution patterns.

According to a further preferred embodiment, the reflector can be pivoted about its horizontal central axis by means of the electric motor. The electric motor is also controlled by the electronic drive. This makes it possible to pivot the reflector to counter changes in the horizontal orientation of the cornering light due to lateral inclination of the vehicle.

While the invention has been particularly shown and described with reference to a preferred embodiment, it will be understood by those skilled in the art that various changes in form and detail may be made therein without departing from the spirit and scope of the invention.

The invention claimed is:

1. A method of adjusting a vehicle headlight during cornering and/or at intersections, comprising the steps of generating low-beam light having a low-beam light distribution pattern and generating cornering light by superimposing a light distribution pattern with a greater horizontal dispersion than that of the low-beam light distribution pattern onto the low-beam light distribution pattern;

wherein the step of superimposing the light distribution pattern with the greater horizontal dispersion is accomplished by a sub-step of superimposing a fog-light distribution pattern on the low-beam light distribution pattern; and wherein is further included the step of regulating a brightness of the fog-light distribution pattern superimposed as a function of cornering.

2. A method as in claim 1, wherein the brightness of the fog-light distribution pattern is regulated by an electronic dimmer switch.

3. A method as in claim 1, wherein the brightness of the fog-light distribution pattern is regulated by a clocked direct current power supply with a modulated pulse-pause ratio.

4. A method as in claim 2, wherein the fog-light distribution pattern is gradually brightened into the low-beam light distribution pattern depending on a steering radius.

5. A method as in claim 2, wherein the fog-light distribution pattern is gradually brightened into the low beam distribution pattern as a function of lateral inclination of the vehicle.

6. A method as in claim 1, wherein the low-beam light distribution pattern is created by a low-beam light means and wherein is further included the steps of combining the fog-light distribution pattern of a fog-light means and a high-beam light pattern of a high-beam light means into the low-beam light distribution pattern and wherein is further included the step of coordinating the combining of these light distribution patterns using an electronic drive for providing electronic signals for controlling operation of the low-beam light means, the fog-light means and the high-beam light means.

7. A headlight for generating a cornering light, said headlight including a low-beam light means for creating low-beam light having a low-beam light distribution pattern, and a fog-light means for creating fog light having a fog-light distribution pattern superimposed on the low-beam light distribution pattern;

wherein is further included a high-beam light means for creating high-beam light having a high-beam light distribution pattern superimposed on the low-beam light distribution pattern;

wherein is further included an electronic drive for providing electronic signals and wherein the low-beam light means for creating the low-beam light distribution pattern, the fog-light means for creating the fog-light distribution pattern and the high-beam light means for creating the high-beam light distribution pattern are connected to the electronic drive; and wherein the electronic drive coordinates signals using algorithms for thereby combining light distribution patterns.

8. A headlight as in claim 7, wherein the headlight includes a reflector and wherein the low-beam light means comprises a low-beam light surface of the reflector for creating the low-beam light distribution pattern, the fog-light means comprises a fog-light surface of the reflector for creating the fog-light distribution pattern, and the high-beam light means comprises high-beam light surface of the reflector for creating the high-beam light distribution pattern.

9. A headlight as in claim 8, wherein the reflector includes a means for pivoting the reflector about a horizontal central, optical, axis.

10. A headlight as in claim 7, wherein is further included at least one sensor for registering one of lateral inclination and a steering radius, said at least one sensor being connected to the electronic drive.

* * * * *